US011304083B2

(12) United States Patent
Liu

(10) Patent No.: US 11,304,083 B2
(45) Date of Patent: Apr. 12, 2022

(54) METHODS AND DEVICES FOR RECEIVING AND REPORTING MEASUREMENT SIGNALS

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 84 days.

(21) Appl. No.: 16/655,585

(22) Filed: Oct. 17, 2019

(65) Prior Publication Data

US 2020/0053588 A1 Feb. 13, 2020

Related U.S. Application Data

(63) Continuation of application No. PCT/CN2017/086378, filed on May 27, 2017.

(51) Int. Cl.
*H04L 12/26* (2006.01)
*H04W 24/10* (2009.01)
*H04W 16/28* (2009.01)
*H04W 88/02* (2009.01)

(52) U.S. Cl.
CPC .......... *H04W 24/10* (2013.01); *H04W 16/28* (2013.01); *H04W 88/02* (2013.01)

(58) Field of Classification Search
CPC .............................. H04W 24/10; H04W 16/28
USPC .............. 455/450–453; 370/252, 230.1–236, 370/441–443, 329–330, 335–345
See application file for complete search history.

(56) References Cited

U.S. PATENT DOCUMENTS

| 6,522,643 | B1* | 2/2003 | Jacomb-Hood .... | H04B 7/18539 |
| | | | | 370/330 |
| 9,455,777 | B1* | 9/2016 | Johnson .............. | H04W 84/06 |
| 2008/0253297 | A1* | 10/2008 | Hulbert .............. | H04W 16/28 |
| | | | | 370/252 |

(Continued)

FOREIGN PATENT DOCUMENTS

| CN | 102348189 A | 2/2012 |
| CN | 105684323 A | 6/2016 |

(Continued)

OTHER PUBLICATIONS

First Office Action of Chinese Application No. 201780000393.8, dated Sep. 18, 2020.

(Continued)

*Primary Examiner* — Thai D Hoang
(74) *Attorney, Agent, or Firm* — Finnegan, Henderson, Farabow, Garrett & Dunner, L.L.P.

(57) ABSTRACT

A method for receiving a measurement signal includes: receiving multi-beam measurement capability information reported by user equipment (UE); generating, according to the multi-beam measurement capability information, first measurement configuration information for the UE, the first measurement configuration information including multiple beams configured by the base station for the UE; sending to the UE the first measurement configuration information, such that the UE generates first measurement signals according to the multiple beams in the first measurement configuration information; and receiving the first measurement signals reported by the UE.

20 Claims, 15 Drawing Sheets

(56) References Cited

U.S. PATENT DOCUMENTS

| | | | |
|---|---|---|---|
| 2012/0207045 A1* | 8/2012 | Pelletier | H04W 72/0446 |
| | | | 370/252 |
| 2014/0198681 A1 | 7/2014 | Jung et al. | |
| 2014/0295752 A1* | 10/2014 | Dankberg | H04B 7/18519 |
| | | | 455/12.1 |
| 2015/0230263 A1* | 8/2015 | Roy | H04W 64/003 |
| | | | 455/452.2 |
| 2015/0382214 A1* | 12/2015 | Cheng | H04W 48/16 |
| | | | 370/252 |
| 2016/0150435 A1 | 5/2016 | Baek et al. | |
| 2016/0241322 A1 | 8/2016 | Son et al. | |
| 2016/0241323 A1* | 8/2016 | Ko | H04B 7/0452 |
| 2016/0261325 A1 | 9/2016 | Ko et al. | |
| 2016/0337916 A1 | 11/2016 | Deenoo et al. | |
| 2017/0163326 A1* | 6/2017 | Kim | H04B 7/0639 |
| 2017/0223689 A1 | 8/2017 | Son et al. | |
| 2017/0230857 A1 | 8/2017 | Jung et al. | |
| 2017/0367114 A1* | 12/2017 | Ahn | H04L 5/0023 |
| 2018/0041262 A1* | 2/2018 | Kang | H04B 7/063 |
| 2018/0270844 A1* | 9/2018 | Kim | H04B 7/0617 |
| 2018/0324730 A1* | 11/2018 | Lee | H04W 48/08 |
| 2019/0132066 A1* | 5/2019 | Park | H04W 36/0079 |
| 2019/0181941 A1* | 6/2019 | Kim | H04W 72/042 |
| 2020/0077362 A1* | 3/2020 | Liu | H04W 68/025 |
| 2020/0187172 A1* | 6/2020 | Wang | H04B 7/0695 |
| 2021/0051609 A1* | 2/2021 | Muruganathan | H04B 7/0482 |

FOREIGN PATENT DOCUMENTS

| | | | |
|---|---|---|---|
| CN | 106452698 A | 2/2017 | |
| CN | 106535215 A | 3/2017 | |
| EP | 0780998 A2 * | 6/1997 | ......... H04B 7/18521 |
| EP | 3 068 060 A1 | 9/2016 | |
| WO | WO 2010/043752 A1 | 4/2010 | |
| WO | WO 2014/112789 A1 | 7/2014 | |
| WO | WO 2015046895 A1 | 4/2015 | |

OTHER PUBLICATIONS

International Search Report in the international application No. PCT/CN2017/086378, dated Feb. 22, 2018.
English translation of the Written Opinion of the International Search Authority in the international application No. PCT/CN2017/086378, dated Feb. 22, 2018.
Extended European Search Report in the European Application No. 17911859.1, dated Mar. 9, 2020.
Nokia, et al., "UE NR RRM measurement capabilities", R4-1705157, 3GPP TSG-RAN WG4 Meeting #83, Hangzhou, China, May 15-19, 2017, 4 pgs.
Examination Report of Indian Application No. 201947042923, dated Feb. 8, 2021.
Office Action dated Apr. 30, 2021, from European Patent Office in counterpart European Application No. 17911859.1.

* cited by examiner

METHODS AND DEVICES FOR RECEIVING AND REPORTING MEASUREMENT SIGNALS

CROSS-REFERENCE TO RELATED APPLICATIONS

This is a continuation application of International Patent Application No. PCT/CN2017/086378, filed on May 27, 2017, the contents of which are hereby incorporated by reference in its entirety.

FIELD

The present disclosure relates to the technical field of communication, and particularly to methods and devices for receiving and reporting measurement signals.

BACKGROUND

At present, 5th Generation (5G) standardization of the 3rd Generation Partnership Project (3GPP) requires mobility measurement to be ensured. However, unlike a Long Term Evolution (LTE) system, in a 5G high-frequency system, a measurement reference signal is scanned based on a beam and thus management over measurement beams is different from that of the LTE system.

In related art, when user equipment (UE) is in a coverage of two beams, a system only configures one of the two beams as a measurement reference signal beam of the UE. However, the beam configured by the system may not be an optimal beam. Therefore, a signal measured by the UE based on the beam configured by the system may be not so accurate.

SUMMARY

In view of this, the present disclosure provides methods and devices for receiving and reporting a measurement signal and a computer-readable storage medium, to improve accuracy of a measurement signal of UE in a multi-beam coverage scenario.

According to a first aspect of embodiments of the present disclosure, a method for receiving a measurement signal includes: receiving multi-beam measurement capability information reported by user equipment (UE); generating first measurement configuration information for the UE according to the multi-beam measurement capability information, the first measurement configuration information including multiple beams configured for the UE by a base station; sending the first measurement configuration information to the UE such that the UE generates first measurement signals according to the multiple beams in the first measurement configuration information; and receiving the first measurement signals reported by the UE.

According to a second aspect of the embodiments of the present disclosure, a method for reporting a measurement signal includes: reporting multi-beam measurement capability information of UE to a base station; receiving first measurement configuration information sent by the base station according to the multi-beam measurement capability information, the first measurement configuration information including multiple beams configured for the UE by the base station; generating first measurement signals according to the multiple beams in the first measurement configuration information; and reporting the first measurement signals to the base station.

According to a third aspect of the embodiments of the present disclosure, a base station includes: a processor; and a memory configured to store instructions executable by the processor, wherein the processor is configured to: receive multi-beam measurement capability information reported by UE; generate first measurement configuration information for the UE according to the multi-beam measurement capability information, the first measurement configuration information including multiple beams configured for the UE by the base station; send the first measurement configuration information to the UE such that the UE generates first measurement signals according to the multiple beams in the first measurement configuration information; and receive the first measurement signals reported by the UE.

According to a fourth aspect of the embodiments of the present disclosure, UE includes: a processor; and a memory configured to store instructions executable for the processor, wherein the processor may be configured to: report multi-beam measurement capability information of the UE to a base station; receive first measurement configuration information sent by the base station according to the multi-beam measurement capability information, the first measurement configuration information including multiple beams configured for the UE by the base station; generate first measurement signals according to the multiple beams in the first measurement configuration information; and report the first measurement signals to the base station.

According to a fifth aspect of the embodiments of the present disclosure, a computer-readable storage medium has stored therein instructions that, when executed by a processor of a device, cause the device to implement the steps of the method for receiving a measurement signal.

According to a sixth aspect of the embodiments of the present disclosure, a computer-readable storage medium has stored therein instructions that, when executed by a processor of a device, cause the device to implement the steps of the method for reporting a measurement signal.

It is to be understood that the above general descriptions and detailed descriptions below are only exemplary and explanatory and not intended to limit the present disclosure.

DETAILED DESCRIPTION

The technical solutions in the embodiments of the present disclosure will be described below in combination with the accompanying drawings. It is apparent that the described embodiments are not all embodiments but only exemplary embodiments of the present disclosure. All other embodiments obtained by those of ordinary skill in the art based on the embodiments described in the present disclosure without creative work shall fall within the scope of protection of the present disclosure.

Figure 1:
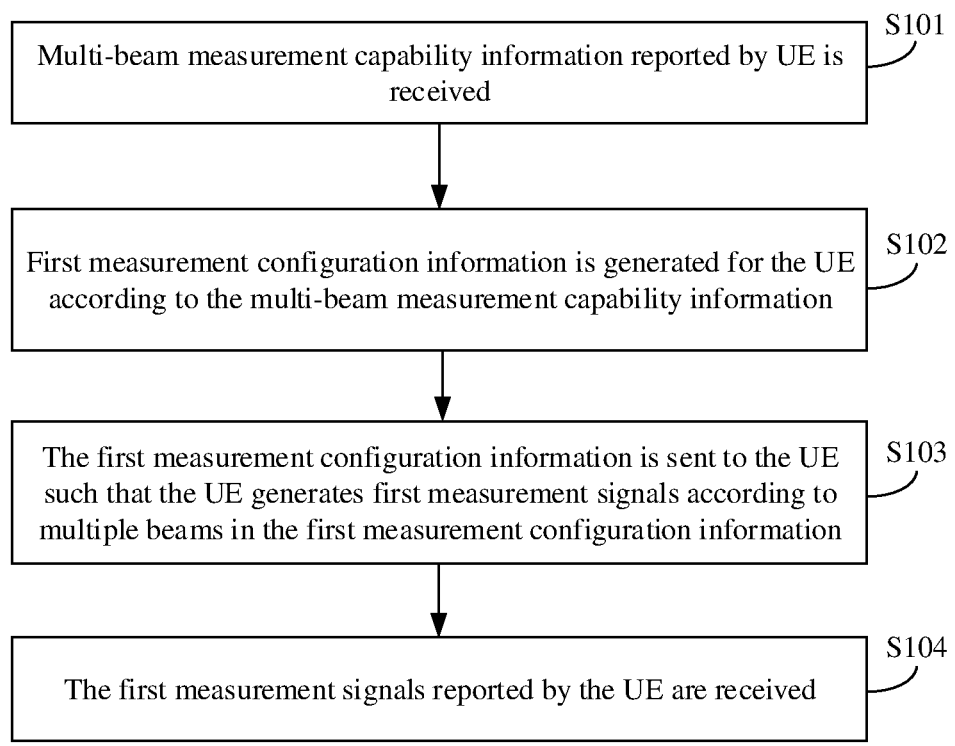
FIG. 1 is a flow chart of a method for receiving a measurement signal, according to an exemplary embodiment.

FIG. 1 is a flow chart of a method for receiving a measurement signal, according to an exemplary embodiment. The method may be performed by a base station. As illustrated in FIG. 1, the method includes the following steps.

In S101, multi-beam measurement capability information reported by UE is received.

The UE may report its own multi-beam measurement capability information to the base station and may also report its own single-beam measurement capability information to the base station.

In S102, first measurement configuration information is generated for the UE according to the multi-beam measurement capability information, the first measurement configuration information including multiple beams configured for the UE by a base station.

The base station receives the multi-beam measurement capability information reported by the UE, to generate the first measurement configuration information according to the multi-beam measurement capability information. If the UE has a multi-beam measurement capability, the base station may configure a single-beam or multi-beam measurement capability for the UE, and if the UE has the single-beam measurement capability, the base station may configure the single-beam measurement capability for the UE only.

In the embodiment, since the UE has the multi-beam measurement capability, the base station may configure the multiple beams for the UE.

In an embodiment, the multiple beams in the first measurement configuration information may be neighboring beams, and the first measurement configuration information may further include indication information for simultaneous measurement of the neighboring beams.

In S103, the first measurement configuration information is sent to the UE such that the UE generates first measurement signals according to the multiple beams in the first measurement configuration information.

After the base station sends the first measurement configuration information including the multiple beams to the UE, the UE may generate the first measurement signals according to the multiple beams in the first measurement configuration information to improve accuracy of measurement signals. For example, corresponding measurement signals may be generated based on signal synchronization blocks of the multiple beams, the measurement signals are smoothed to obtain first measurement signals, and the first measurement signals are reported to the base station.

In an embodiment, if the first measurement configuration information includes the indication information for simultaneous measurement of the neighboring beams and the multiple beams are neighboring beams, the UE may simultaneously generate the first measurement signals, each of which corresponds to a respective beam, according to the neighboring beams and the indication information and report the first measurement signals to the base station.

In S104, the first measurement signals reported by the UE are received.

The base station may receive the first measurement signals reported by the UE.

According to the embodiment, the first measurement configuration information including the multiple beams is generated for the UE according to the multi-beam measurement capability information reported by the UE, and then the UE may generate the first measurement signals according to the multiple beams in the first measurement configuration information, so that accuracy of the measurement signal of the UE in a multi-beam coverage scenario is improved.

Figure 2:
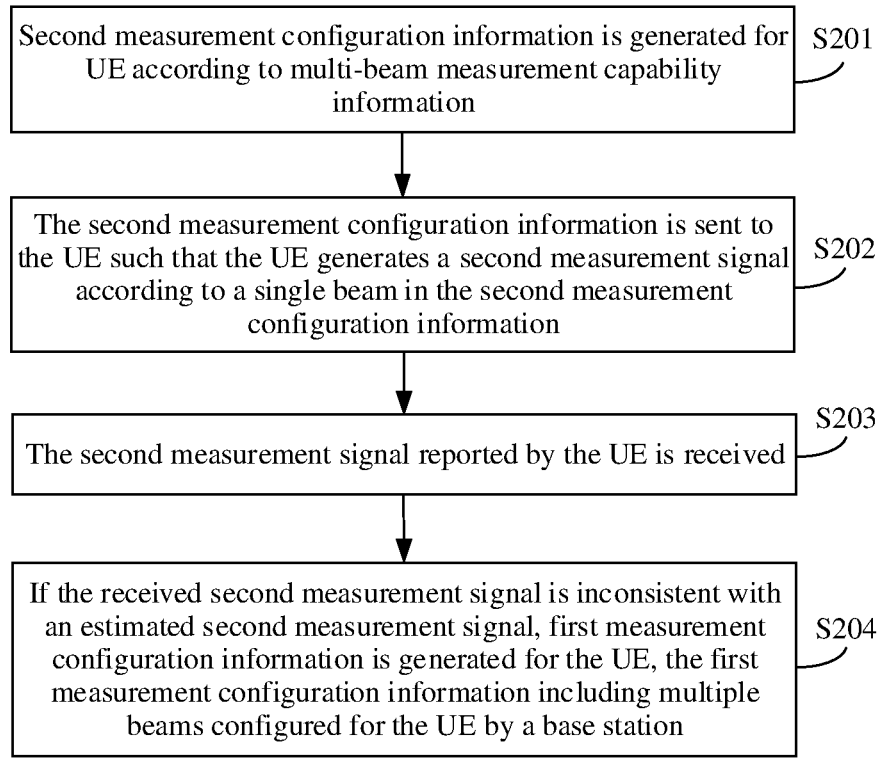
FIG. 2 is a flow chart illustrating generation of first measurement configuration information for UE according to multi-beam measurement capability information, according to an exemplary embodiment.

FIG. 2 is a flow chart illustrating generation of first measurement configuration information for UE according to multi-beam measurement capability information, according to an exemplary embodiment. As illustrated in FIG. 2, the operation that the first measurement configuration information is generated may include the following steps.

In S201, second measurement configuration information is generated for the UE according to the multi-beam measurement capability information, the second measurement configuration information including a single beam configured for the UE by the base station.

In the embodiment, since the UE has the multi-beam measurement capability, the base station may configure the single beam for the UE at first.

In S202, the second measurement configuration information is sent to the UE such that the UE generates a second measurement signal according to the single beam in the second measurement configuration information.

The base station may send the configured single beam to the UE, and the UE, after receiving the configured single beam, may generate the second measurement signal according to the single beam and report the second measurement signal to the base station.

In S203, the second measurement signal reported by the UE is received.

In S204, if the received second measurement signal is inconsistent with an estimated second measurement signal, the first measurement configuration information is generated for the UE, the first measurement configuration information including the multiple beams configured for the UE by the base station.

If the second measurement signal received by the base station is inconsistent with the estimated second measurement signal, for example, the estimated second measurement signal is within a preset threshold value range and, if the received second measurement signal is not within the preset threshold value range, it is determined that they are inconsistent, which indicates that the second measurement signal generated by the UE based on the single beam configured by the base station is not so accurate, and the base station may reconfigure beams for the UE, for example, configuring the multiple beams for the UE.

It is to be noted that the process of generating the first measurement configuration information in FIG. 2 may be S102 in FIG. 1. That is, since the UE has the multi-beam measurement capability, the base station may configure the multiple beams for the UE, and may also configure the single beam for the UE at first and, if the second measurement signal generated based on the single beam is not so accurate, reconfigure the multiple beams instead of the single beam.

According to the embodiment, the single beam is configured for the UE at first, and then under the condition that the second measurement signal generated based on the single beam is not so accurate, the multiple beams are configured instead of the single beam, so that improvement in the accuracy of the measurement signal is achieved.

Figure 3:
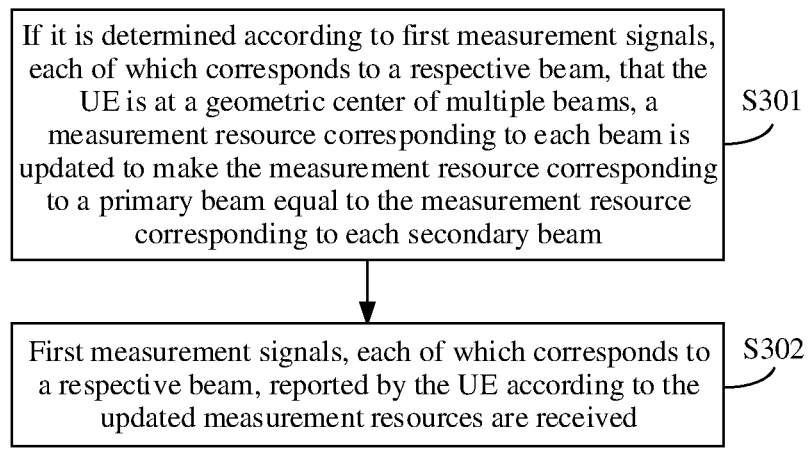
FIG. 3 is a flow chart of a method for receiving a measurement signal, according to an exemplary embodiment.

FIG. 3 is a flow chart of a method for receiving a measurement signal, according to an exemplary embodiment. This embodiment is based on the embodiment illustrated in FIG. 1. In this embodiment, the multiple beams may include a primary beam and at least one secondary beam, the first measurement configuration information may further include a measurement resource corresponding to the primary beam and measurement resources corresponding to the at least one secondary beam respectively, the measurement resource corresponding to the primary beam being greater than the measurement resource corresponding to each secondary beam, and each of the first measurement signals corresponds to a respective beam. As illustrated in FIG. 3, after S104, the method may further include the following steps.

In S301, if it is determined, according to the first measurement signals each of which corresponds to a respective beam, that the UE is at a geometric center of the multiple beams, the measurement resource corresponding to each beam is updated to make the measurement resource corresponding to the primary beam equal to the measurement resource corresponding to each secondary beam.

For different numbers of beams, geometric centers are different. For example, for two beams, the geometric center is a middle position between the two beams.

If the multiple beams are two beams, i.e., a primary beam and a secondary beam, when the base station determines, according to first measurement signals corresponding to the two beams, that the UE is at a middle position between the two beams, it indicates that the primary beam and the secondary beam require the same measurement resource. Therefore, the measurement resource corresponding to each beam may be updated to make the measurement resource corresponding to the primary beam equal to the measurement resource corresponding to the secondary beam.

In S302, the first measurement signals reported by the UE according to the updated measurement resources corresponding to respective beams are received.

After the base station updates the measurement resource corresponding to each beam, the UE may report the first measurement signal corresponding to each beam according to the updated measurement resources.

According to the embodiment, after it is determined that the UE is at the geometric center, the measurement resource corresponding to each beam is updated to make the measurement resource corresponding to the primary beam equal to the measurement resource corresponding to each secondary beam, so that the measurement resource is reasonably allocated for each beam, and the accuracy of the measurement signal may be ensured.

Figure 4A:
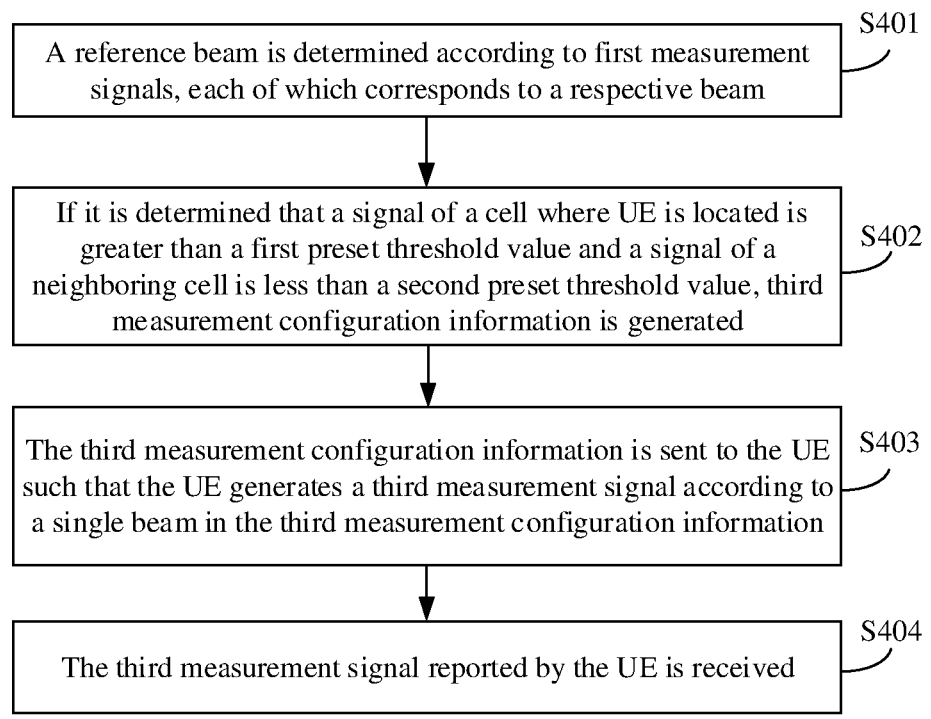
FIG. 4A is a flow chart of a method for receiving a measurement signal, according to an exemplary embodiment.

FIG. 4A is a flow chart of a method for receiving a measurement signal, according to an exemplary embodiment. This embodiment is based on the embodiment illustrated in FIG. 3. As illustrated in FIG. 4A, before S301, the method may further include the following steps.

In S401, a reference beam is determined according to the first measurement signals, each of which corresponds to a respective beam.

For example, the first measurement signals correspond to the multiple beams, respectively, and a beam with high signal quality is selected from the multiple beams as the reference beam.

In S402, if it is determined that a signal of a cell where the UE is located is greater than a first preset threshold value and a signal of a neighboring cell is less than a second preset threshold value, third measurement configuration information is generated, the third measurement configuration information including a single beam configured for the UE by the base station and the single beam being the reference beam.

The first preset threshold value is greater than the second preset threshold value.

Since the UE is mobile, for improving the accuracy of the measurement signal, the single beam may be configured for the UE, and the single beam may be the reference beam.

Figure 4B:
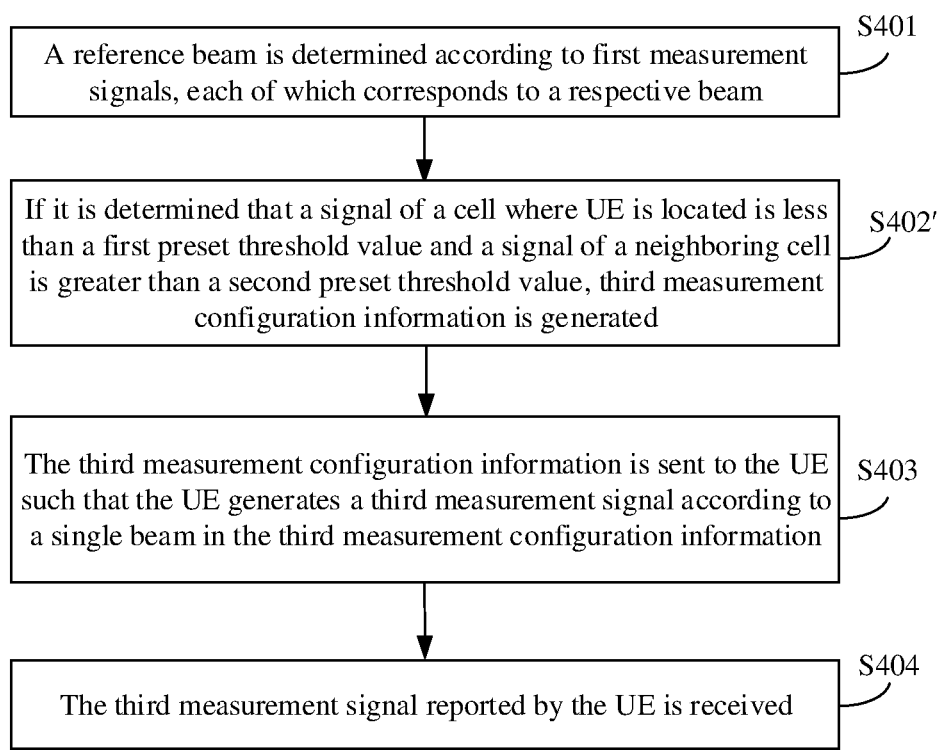
FIG. 4B is a flow chart of a method for receiving a measurement signal, according to an exemplary embodiment.

If it is determined that the signal of the cell where the UE is located is greater than the first preset threshold value and the signal of the neighboring cell is less than the second preset threshold value, it indicates that the UE is still in the present cell. But if it is determined that the signal of the cell where the UE is located is less than the first preset threshold value and the signal of the neighboring cell is greater than the second preset threshold value, it indicates that the UE may be handed over to the neighboring cell. A measurement reporting process corresponding to the condition of handover of the UE to the neighboring cell is substantially the same as a measurement reporting process for the condition that the UE is still in the present cell, and the difference is that a judgment condition is different, namely S402 may be replaced with S402', as illustrated in FIG. 4B.

In S402', if it is determined that a signal of a cell where the UE is located is less than the first preset threshold value and a signal of a neighboring cell is greater than the second preset threshold value, the third measurement configuration information is generated, the third measurement configuration information including the single beam configured for the UE by the base station and the single beam being the reference beam.

It is to be noted that, although the measurement signal reporting processes of the UE under the two conditions are the same, the reference signals are different, because a beam belongs to a cell and beams of different cells are different in case of handover between the cells.

In S403, the third measurement configuration information is sent to the UE such that the UE generates a third measurement signal according to the single beam in the second measurement configuration information.

In S404, the third measurement signal reported by the UE is received.

According to the embodiment, the reference beam is determined, the single beam is configured for the UE, and the single beam is the determined reference beam, so that the UE may generate the third measurement signal according to the configured reference beam, and the accuracy of the measurement signal is improved.

Figure 5A:
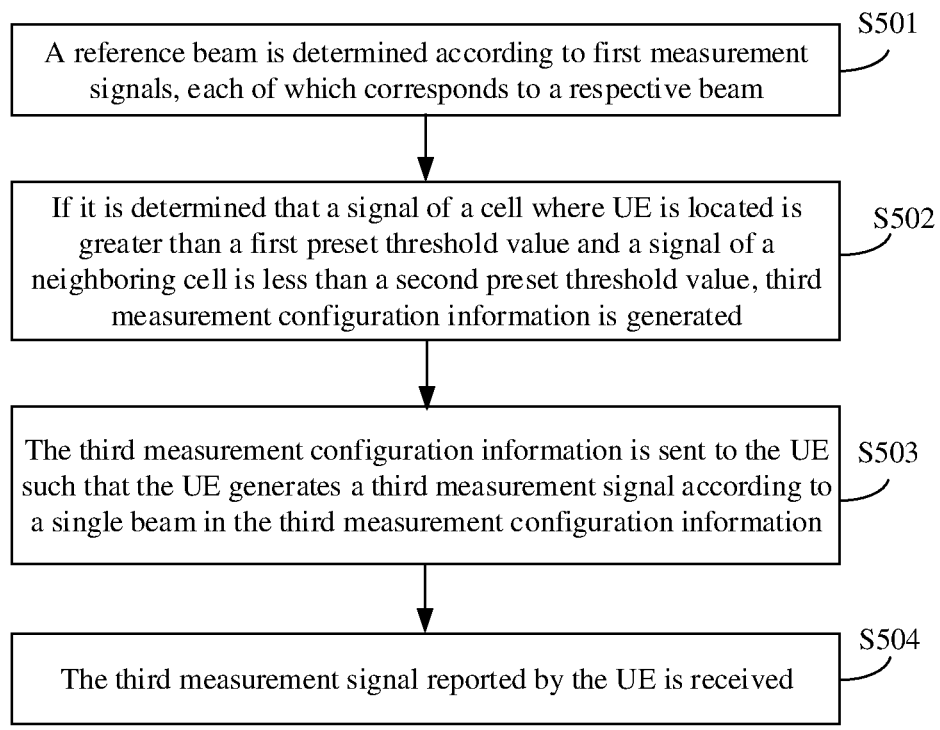
FIG. 5A is a flow chart of a method for receiving a measurement signal, according to an exemplary embodiment.

FIG. 5A is a flow chart of a method for receiving a measurement signal, according to an exemplary embodiment. This embodiment is based on the embodiment illustrated in FIG. 1. In this embodiment, the first measurement configuration information may further include the measurement resource corresponding to each beam, the measurement resource corresponding to each beam being the same, and each of the first measurement signals corresponds to a respective beam. As illustrated in FIG. 5A, after S104, the method may further include the following steps.

In S501, the reference beam is determined according to the first measurement signals, each of which corresponds to a respective beam.

For example, the first measurement signals correspond to the multiple beams, respectively, and a beam with high signal quality in the first measurement signals is selected as the reference beam.

In S502, if it is determined that a signal of a cell where the UE is located is greater than the first preset threshold value and a signal of a neighboring cell is less than the second preset threshold value, the third measurement configuration information is generated, the third measurement configuration information including a single beam configured for the UE by the base station and the single beam being the reference beam.

The first preset threshold value is greater than the second preset threshold value.

Since the UE is mobile, for improving the accuracy of the measurement signal, the single beam may be configured for the UE, and the single beam may be the reference beam.

Figure 5B:
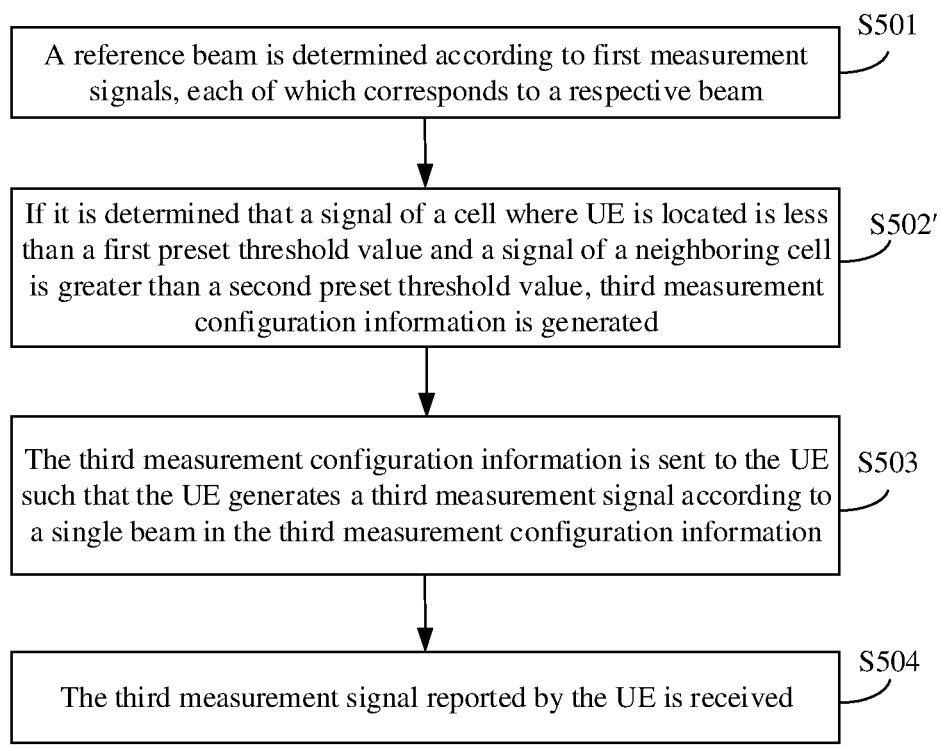
FIG. 5B is a flow chart of a method for receiving a measurement signal, according to an exemplary embodiment.

If it is determined that a signal of a cell where the UE is located is greater than the first preset threshold value and a signal of a neighboring cell is less than the second preset threshold value, it indicates that the UE is still in the present cell. But if it is determined that a signal of a cell where the UE is located is less than the first preset threshold value and a signal of a neighboring cell is greater than the second preset threshold value, it indicates that the UE may be handed over to the neighboring cell. The measurement reporting process corresponding to the condition of handover of the UE to the neighboring cell is substantially the same as the measurement reporting process for the condition that the UE is still in the present cell, and the difference is that a judgment condition is different, namely S502 may be replaced with S502', as illustrated in FIG. 5B.

In S502', if it is determined that a signal of a cell where the UE is located is less than the first preset threshold value and a signal of a neighboring cell is greater than the second preset threshold value, the third measurement configuration information is generated, the third measurement configuration information including the single beam configured for the UE by the base station and the single beam being the reference beam.

It is to be noted that, although the measurement signal reporting processes of the UE under the two conditions are the same, the reference signals are different because a beam belongs to a cell and beams of different cells are certainly different in case of handover between the cells.

In S503, the third measurement configuration information is sent to the UE such that the UE generates the third measurement signal according to the single beam in the second measurement configuration information.

In S504, the third measurement signal reported by the UE is received.

According to the embodiment, the reference beam is determined, the single beam is configured for the UE, and the single beam is the determined reference beam, so that the UE may generate the third measurement signal according to the configured reference beam, and the accuracy of the measurement signal is improved.

Figure 6:
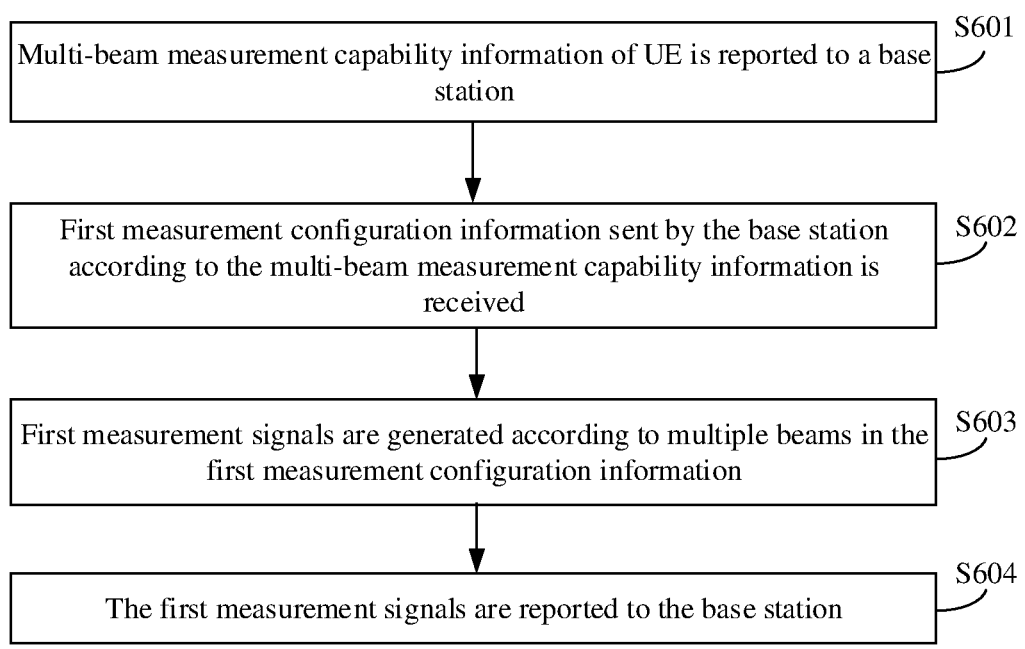
FIG. 6 is a flow chart of a method for reporting a measurement signal, according to an exemplary embodiment.

FIG. 6 is a flow chart of a method for reporting a measurement signal, according to an exemplary embodiment. The method may be performed by UE. As illustrated in FIG. 6, the method includes the following steps.

In S601, multi-beam measurement capability information of UE is reported to a base station.

The UE may report its own multi-beam measurement capability information to the base station.

In S602, first measurement configuration information sent by the base station according to the multi-beam measurement capability information is received, the first measurement configuration information including multiple beams configured for the UE by the base station.

The base station, after receiving the multi-beam measurement capability information reported by the UE, may generate the first measurement configuration information according to the multi-beam measurement capability information reported by the UE and send the first measurement configuration information to the UE.

In an embodiment, the multiple beams in the first measurement configuration information may be neighboring beams, and the first measurement configuration information may further include indication information for simultaneous measurement of the neighboring beams.

In S603, first measurement signals are generated according to the multiple beams in the first measurement configuration information.

The UE may generate the first measurement signals according to the multiple beams in the first measurement configuration information to improve accuracy of the measurement signal. For example, corresponding measurement signals may be generated based on signal synchronization blocks of the multiple beams, and the measurement signals are smoothed to obtain first measurement signals.

In an embodiment, if the first measurement configuration information includes the indication information for simultaneous measurement of the neighboring beams and the multiple beams are neighboring beams, the UE may simultaneously generate the first measurement signals, each of which corresponds to a respective beam, according to the neighboring beams and the indication information.

In S604, the first measurement signals are reported to the base station.

The UE may report the first measurement signals to the base station.

According to the embodiment, the multi-beam measurement capability information of the UE is reported to the base station to enable the base station to send the first measurement configuration information to the UE according to the multi-beam measurement capability information reported by the UE, and the UE, after receiving the first measurement configuration information, may generate the first measurement signals according to the multiple beams in the first measurement configuration information and reports the first measurement signals to the base station, so that the accuracy of the measurement signal of the UE in the multi-beam coverage scenario is improved.

Figure 7A:
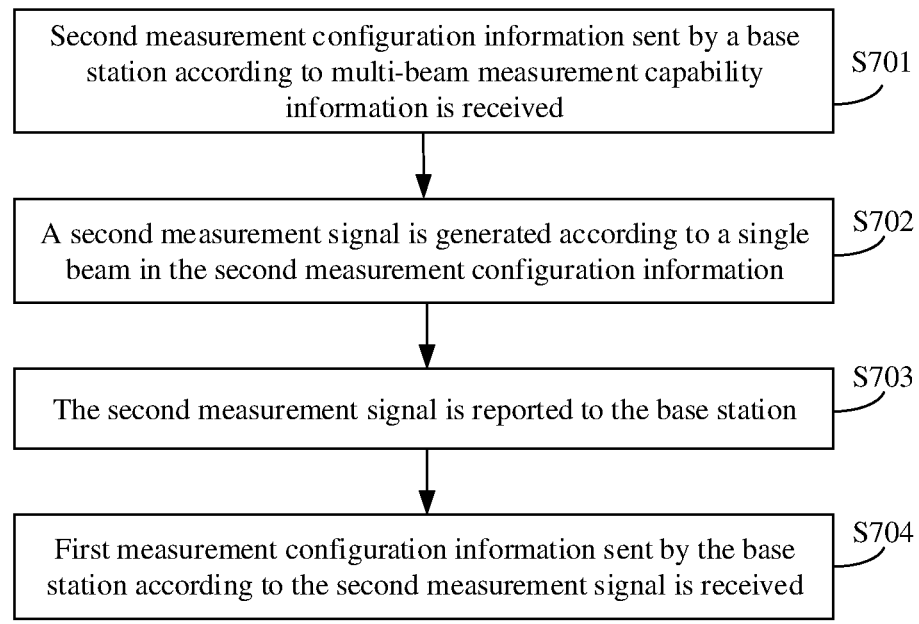
FIG. 7A is a flow chart illustrating reception of first measurement configuration information sent by a base station according to multi-beam measurement capability information, according to an exemplary embodiment.

FIG. 7A is a flow chart illustrating reception of first measurement configuration information sent by a base station according to multi-beam measurement capability information, according to an exemplary embodiment. As illustrated in FIG. 7A, the operation that the first measurement configuration information sent by the base station according to the multi-beam measurement capability information is received includes the following steps.

In S701, second measurement configuration information sent by the base station according to the multi-beam measurement capability information is received, the second measurement configuration information including a single beam configured for the UE by the base station.

In the embodiment, since the UE has a multi-beam measurement capability, the base station may configure the single beam for the UE at first.

In S702, a second measurement signal is generated according to the single beam in the second measurement configuration information.

The UE, after receiving the configured single beam, may generate the second measurement signal according to the single beam.

In S703, the second measurement signal is reported to the base station.

The UE may report the second measurement signal to the base station.

In S704, the first measurement configuration information sent by the base station according to the second measurement signal is received.

If the second measurement signal received by the base station is inconsistent with an estimated second measurement signal, beams may be reconfigured for the UE, for example, the first measurement configuration information including the multiple beams may be sent to the UE.

According to the embodiment, the second measurement signal is generated according to the single beam in the second measurement configuration information sent by the base station and the first measurement configuration information sent by the base station according to the second measurement signal is received, to implement configuration of the multiple beams instead of the single beam under the condition that the second measurement signal generated based on the single beam is not so accurate to enable the UE to generate the first measurement signals based on the multiple beams, so that improvement in the accuracy of the measurement signal is improved.

Figure 7B:
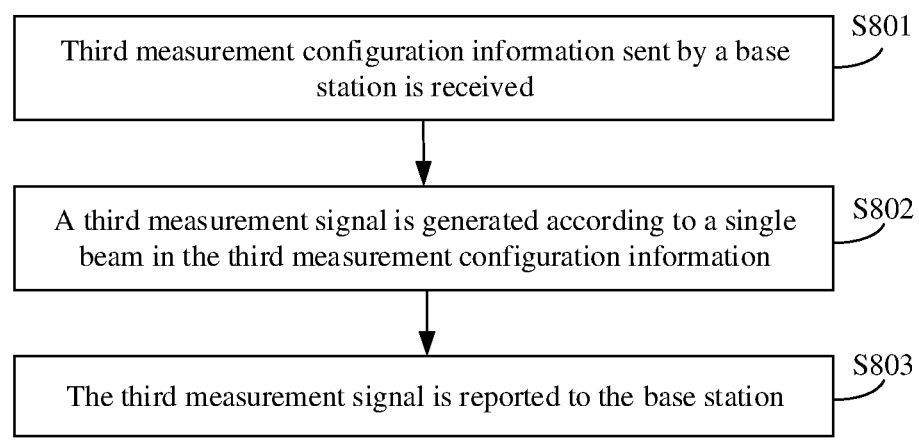
FIG. 7B is a flow chart of a method for reporting a measurement signal, according to an exemplary embodiment.

FIG. 7B is a flow chart of a method for reporting a measurement signal, according to an exemplary embodiment. As illustrated in FIG. 7B, the method may further include the following steps.

In S801, third measurement configuration information sent by the base station is received, the third measurement configuration information including the single beam configured for the UE by the base station.

The UE may receive the third measurement configuration information sent by the base station, the third measurement configuration information may include the single beam configured for the UE by the base station, and the single beam may be a beam with relatively measurement signal quality in the multiple beams corresponding to the UE.

In S802, a third measurement signal is generated according to the single beam in the third measurement configuration information.

The UE may generate the third measurement signal according to the single beam in the third measurement configuration information.

In S803, the third measurement signal is reported to the base station.

The UE may report the third measurement signal to the base station.

According to the embodiment, the third measurement configuration information sent by the base station is received, the third measurement signal is generated according to the single beam in the third measurement configuration information, and the third measurement signal is reported to the base station, so that the accuracy of the measurement signal is ensured.

The technical solutions provided by the embodiments of the present disclosure may have the following beneficial effects.

The first measurement configuration information including the multiple beams is generated for the UE according to the multi-beam measurement capability information reported by the UE, and then the UE may generate the first measurement signals according to the multiple beams in the first measurement configuration information, so that accuracy of the measurement signal of the UE in a multi-beam coverage scenario is improved.

The single beam is configured for the UE at first, and then under the condition that the second measurement signal generated based on the single beam is not so accurate, the multiple beams are configured instead of the single beam, so that improvement in the accuracy of the measurement signal is facilitated.

After it is determined that the UE is at the geometric center, the measurement resource corresponding to each beam is updated to make the measurement resource corresponding to the primary beam equal to the measurement resource corresponding to each secondary beam, so that the measurement resource is reasonably allocated for each beam, and the accuracy of the measurement signal may be ensured.

The reference beam is determined, the single beam is configured for the UE, and the single beam is the determined reference beam, so that the UE may generate the third measurement signal according to the configured reference beam, and the accuracy of the measurement signal is improved.

The reference beam is determined, the single beam is configured for the UE, and the single beam is the determined reference beam, so that the UE may generate the third measurement signal according to the configured reference beam, and the accuracy of the measurement signal is improved.

The multi-beam measurement capability information of the UE is reported to the base station to enable the base station to send the first measurement configuration information to the UE according to the multi-beam measurement capability information reported by the UE, and the UE, after receiving the first measurement configuration information, may generate the first measurement signals according to the multiple beams in the first measurement configuration information and reports the first measurement signals to the base station, so that the accuracy of the measurement signal of the UE in the multi-beam coverage scenario is improved.

The second measurement signal is generated according to the single beam in the second measurement configuration information sent by the base station and the first measurement configuration information sent by the base station according to the second measurement signal is received, to implement configuration of the multiple beams instead of the single beam under the condition that the second measurement signal generated based on the single beam is not so accurate to enable the UE to generate the first measurement signals based on the multiple beams, so that improvement in the accuracy of the measurement signal is improved.

The third measurement configuration information sent by the base station is received, the third measurement signal is generated according to the single beam in the third measurement configuration information, and the third measurement signal is reported to the base station, so that the accuracy of the measurement signal is ensured.

Figure 8:
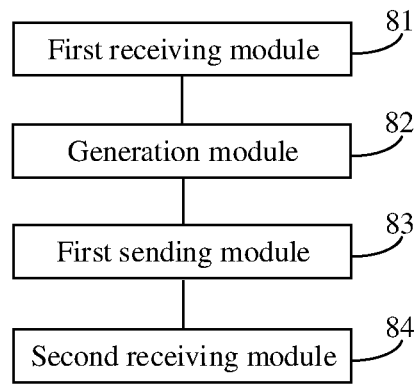
FIG. 8 is a block diagram of a device for receiving a measurement signal, according to an exemplary embodiment.

FIG. 8 is a block diagram of a device for receiving a measurement signal, according to an exemplary embodiment. As illustrated in FIG. 8, the device includes a first receiving module 81, a generation module 82, a first sending module 83 and a second receiving module 84.

The first receiving module 81 is configured to receive multi-beam measurement capability information reported by UE.

The UE may report its own multi-beam measurement capability information to the base station and may also report its own single-beam measurement capability information to the base station.

The generation module 82 is configured to generate first measurement configuration information for the UE according to the multi-beam measurement capability information received by the first receiving module 81, the first measurement configuration information including multiple beams configured for the UE by a base station.

The base station receives the multi-beam measurement capability information reported by the UE to generate the first measurement configuration information according to the multi-beam measurement capability information reported by the UE. If the UE has a multi-beam measurement capability, the base station may configure a single-beam or multi-beam measurement capability for the UE, but if the UE has the single-beam measurement capability, the base station may configure the single-beam measurement capability for the UE only.

In the embodiment, since the UE has the multi-beam measurement capability, the base station may configure the multiple beams for the UE.

In an embodiment, the multiple beams in the first measurement configuration information may be neighboring beams, and the first measurement configuration information may further include indication information for simultaneous measurement of the neighboring beams.

The first sending module 83 is configured to send the first measurement configuration information generated by the generation module 82 to the UE such that the UE generates first measurement signals according to the multiple beams in the first measurement configuration information.

After the base station sends the first measurement configuration information including the multiple beams to the UE, the UE may generate the first measurement signals according to the multiple beams in the first measurement configuration information to improve accuracy of the measurement signal. For example, corresponding measurement signals may be generated based on signal synchronization blocks of the multiple beams, the measurement signals are smoothed to obtain first measurement signals, and the first measurement signals are reported to the base station.

In an embodiment, if the first measurement configuration information includes the indication information for simultaneous measurement of the neighboring beams and the multiple beams are neighboring beams, the UE may simultaneously generate the first measurement signals, each of which corresponds to a respective beam, according to the neighboring beams and the indication information and report the first measurement signals to the base station.

The second receiving module 84 is configured to receive the first measurement signals reported by the UE and generated according to the first measurement configuration information sent by the first sending module 83.

The base station may receive the first measurement signals reported by the UE.

According to the embodiment, the first measurement configuration information including the multiple beams is generated for the UE according to the multi-beam measurement capability information reported by the UE, and then the UE may generate the first measurement signals according to the multiple beams in the first measurement configuration information, so that accuracy of the measurement signal of the UE in a multi-beam coverage scenario is improved.

Figure 9A:
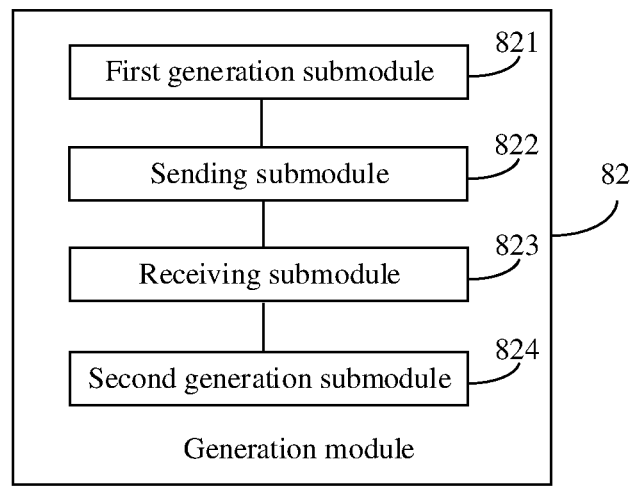
FIG. 9A is a block diagram of a device for receiving a measurement signal, according to an exemplary embodiment.

FIG. 9A is a block diagram of a device for receiving a measurement signal, according to an exemplary embodiment. As illustrated in FIG. 9A, based on the embodiment illustrated in FIG. 8, the generation module 82 may include a first generation submodule 821, a sending submodule 822, a receiving submodule 823 and a second generation submodule 824.

The first generation submodule 821 is configured to generate second measurement configuration information for the UE according to the multi-beam measurement capability information, the second measurement configuration information including a single beam configured for the UE by the base station.

In the embodiment, since the UE has the multi-beam measurement capability, the base station may configure the single beam for the UE at first.

The sending submodule 822 is configured to send the second measurement configuration information generated by the first generation submodule 821 to the UE such that the UE generates a second measurement signal according to the single beam in the second measurement configuration information.

The base station may send the configured single beam to the UE, and the UE, after receiving the configured single beam, may generate the second measurement signal according to the single beam and report the second measurement signal to the base station.

The receiving submodule 823 is configured to receive the second measurement signal reported by the UE and generated according to the second measurement configuration information sent by the sending submodule 822.

The second generation submodule 824 is configured to, if the second measurement signal received by the receiving submodule 823 is inconsistent with an estimated second measurement signal, generate the first measurement configuration information for the UE, the first measurement configuration information including the multiple beams configured for the UE by the base station.

If the second measurement signal received by the base station is inconsistent with an estimated second measurement signal, for example, the estimated second measurement signal is within a preset threshold value range and, if the received second measurement signal is not within the preset threshold value range, it is determined that they are inconsistent, which indicates that the second measurement signal generated by the UE based on the single beam configured by the base station is not so accurate, the base station may reconfigure beams for the UE, for example, configuring the multiple beams for the UE.

According to the embodiment, the single beam is configured for the UE at first, and then under the condition that the second measurement signal generated based on the single beam is not so accurate, the multiple beams are configured instead of the single beam, so that improvement in the accuracy of the measurement signal is facilitated.

Figure 9B:
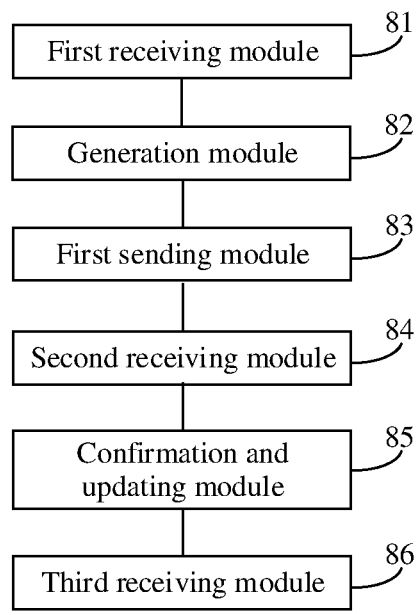
FIG. 9B is a block diagram of a device for receiving a measurement signal, according to an exemplary embodiment.

FIG. 9B is a block diagram of a device for receiving a measurement signal, according to an exemplary embodiment. Based on the embodiment illustrated in FIG. 8, the multiple beams include a primary beam and at least one secondary beam, the first measurement configuration information further includes a measurement resource corresponding to the primary beam and measurement resources corresponding to the at least one secondary beam respectively, the measurement resource corresponding to the primary beam being greater than the measurement resource corresponding to each secondary beam, and the first measurement signals include first measurement signals, each of which corresponds to a respective beam. As illustrated in FIG. 9B, the device may further include a confirmation and updating module 85 and a third receiving module 86.

The confirmation and updating module 85 is configured to, after the second receiving module 84 receives the first measurement signals reported by the UE, if it is determined according to the first measurement signals each of which corresponds to a respective beam that the UE is at a geometric center of the multiple beams, update the measurement resource corresponding to each beam to make the measurement resource corresponding to the primary beam equal to the measurement resource corresponding to each secondary beam.

For different numbers of beams, geometric centers are different. For example, for two beams, the geometric center is a middle position between the two beams.

If the multiple beams are two beams, i.e., a primary beam and a secondary beam, when the base station determines according to first measurement signals corresponding to the two beams that the UE is at a middle position between the two beams, it indicates that the primary beam and the secondary beam require the same measurement resource. Therefore, the measurement resource corresponding to each beam may be updated to make the measurement resource corresponding to the primary beam equal to the measurement resource corresponding to the secondary beam.

The third receiving module 86 is configured to receive the first measurement signals reported by the UE according to the measurement resources updated by the confirmation and updating module 85 and corresponding to each beam.

After the base station updates the measurement resource corresponding to each beam, the UE may report the first measurement signals corresponding to each beam according to the updated measurement resources.

According to the embodiment, after it is determined that the UE is at the geometric center, the measurement resource corresponding to each beam is updated to make the measurement resource corresponding to the primary beam equal to the measurement resource corresponding to each secondary beam, so that the measurement resource is reasonably allocated for each beam, and the accuracy of the measurement signal may be ensured.

Figure 9C:
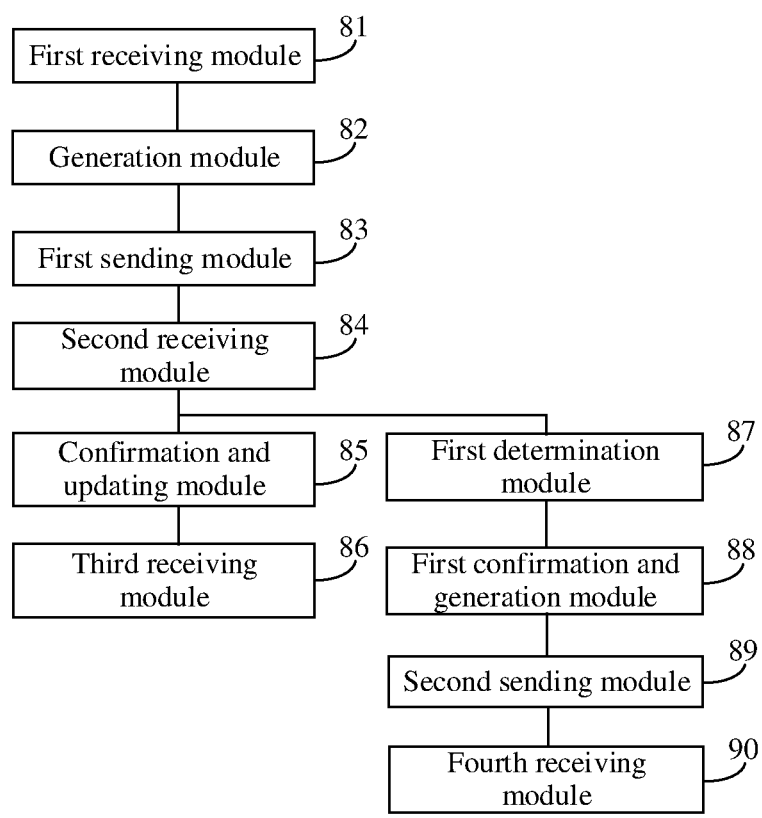
FIG. 9C is a block diagram of a device for receiving a measurement signal, according to an exemplary embodiment.

FIG. 9C is a block diagram of a device for receiving a measurement signal, according to an exemplary embodiment. As illustrated in FIG. 9C, based on the embodiment illustrated in FIG. 9B, the device further includes a first determination module 87, a first confirmation and generation module 88, a second sending module 89 and a fourth receiving module 90.

The first determination module 87 is configured to, before the confirmation and updating module 85 updates the measurement resource corresponding to each beam, determine a reference beam according to the first measurement signals each of which corresponds to a respective beam.

A beam with high signal quality in the first measurement signals corresponding to respective beams is selected as the reference beam.

The first confirmation and generation module 88 is configured to, if it is determined that a signal of a cell where the UE is located is greater than a first preset threshold value and a signal of a neighboring cell is less than a second preset threshold value, generate third measurement configuration information, the third measurement configuration information including the single beam configured for the UE by the base station, the single beam being the reference beam determined by the first determination module 87 and the first preset threshold value being greater than the second preset threshold value.

The first preset threshold value is greater than the second preset threshold value.

Since the UE is mobile, for improving the accuracy of the measurement signal, the single beam may be configured for the UE, and the single beam may be the reference beam.

If it is determined that a signal of a cell where the UE is located is greater than the first preset threshold value and a signal of a neighboring cell is less than the second preset threshold value, it indicates that the UE is still in the present cell.

The second sending module 89 is configured to send the third measurement configuration information generated by the first confirmation and generation module 88 to the UE such that the UE generates a third measurement signal according to the single beam in the third measurement configuration information.

The fourth receiving module 90 is configured to receive the third measurement signal reported by the UE and generated according to the third measurement configuration information sent by the second sending module 89.

According to the embodiment, the reference beam is determined, the single beam is configured for the UE, and the single beam is the determined reference beam, so that the UE may generate the third measurement signal according to the configured reference beam, and the accuracy of the measurement signal is improved.

Figure 9D:
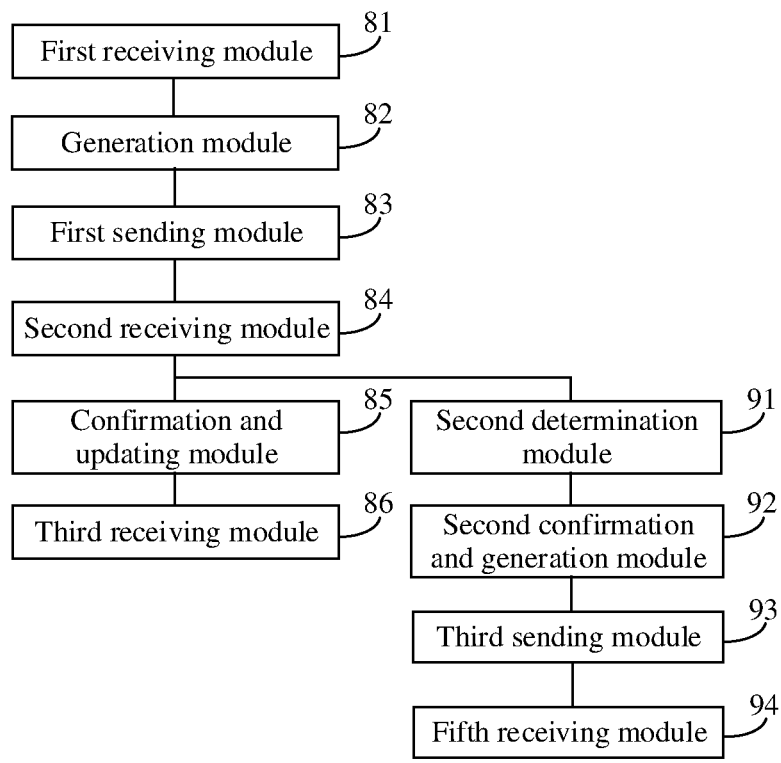
FIG. 9D is a block diagram of a device for receiving a measurement signal, according to an exemplary embodiment.

FIG. 9D is a block diagram of a device for receiving a measurement signal, according to an exemplary embodiment. As illustrated in FIG. 9D, based on the embodiment illustrated in FIG. 9B, the device further includes a second determination module 91, a second confirmation and generation module 92, a third sending module 93 and a fifth receiving module 94.

The second determination module 91 is configured to, before the confirmation and updating module updates the measurement resource corresponding to each beam, determine the reference beam according to the first measurement signals each of which corresponds to a respective beam.

The second confirmation and generation module 92 is configured to, if it is confirmed that a signal of a cell where the UE is located is less than the first preset threshold value and a signal of a neighboring cell is greater than the second preset threshold value, generate the third measurement configuration information, the third measurement configuration information including the single beam configured for the UE by the base station, the single beam being the reference beam determined by the second determination module 91 and the first preset threshold value being greater than the second preset threshold value.

But if it is determined that a signal of a cell where the UE is located is less than the first preset threshold value and a signal of a neighboring cell is greater than the second preset threshold value, it indicates that the UE may be handed over to the neighboring cell. A measurement reporting process corresponding to the condition of handover of the UE to the neighboring cell is substantially the same as a measurement reporting process for the condition that the UE is still in the present cell.

The third sending module 93 is configured to send the third measurement configuration information generated by the second confirmation and generation module 92 to the UE such that the UE generates the third measurement signal according to the single beam in the third measurement configuration information.

The fifth receiving module 94 is configured to receive the third measurement signal reported by the UE and generated according to the third measurement configuration information sent by the third sending module 93.

According to the embodiment, the reference beam is determined, the single beam is configured for the UE, and the single beam is the determined reference beam, so that the UE may generate the third measurement signal according to the configured reference beam, and the accuracy of the measurement signal is improved.

Figure 9E:
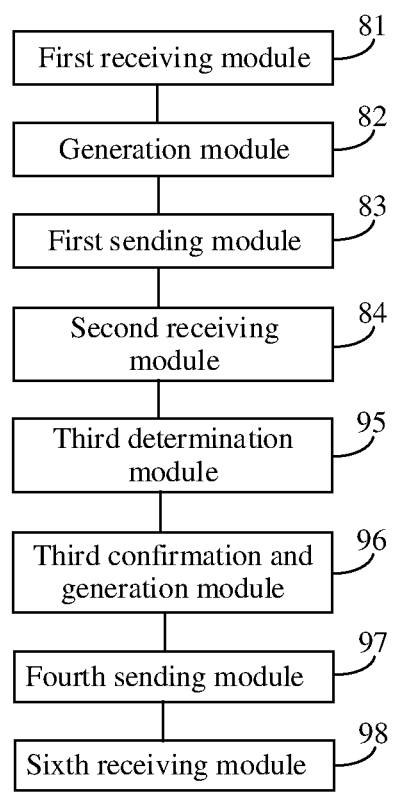
FIG. 9E is a block diagram of a device for receiving a measurement signal, according to an exemplary embodiment.

FIG. 9E is a block diagram of a device for receiving a measurement signal, according to an exemplary embodiment. Based on the embodiment illustrated in FIG. 8, the first measurement configuration information further includes the measurement resource corresponding to each beam, the measurement resource corresponding to each beam being the same, and the first measurement signals include the first measurement signals each of which corresponds to a respective beam. As illustrated in FIG. 9E, the device may further include a third determination module 95, a third confirmation and generation module 96, a fourth sending module 97 and a sixth receiving module 98.

The third determination module 95 is configured to, after the second receiving module 84 receives the first measurement signals reported by the UE, determine the reference beam according to the first measurement signals each of which corresponds to a respective beam.

The third confirmation and generation module 96 is configured to, if it is determined that a signal of a cell where the UE is located is greater than the first preset threshold value and a signal of a neighboring cell is less than the second preset threshold value, generate the third measurement configuration information, the third measurement configuration information including the single beam configured for the UE by the base station, the single beam being the reference beam determined by the third determination module 95 and the first preset threshold value being greater than the second preset threshold value.

The fourth sending module 97 is configured to send the third measurement configuration information generated by the third confirmation and generation module 96 to the UE such that the UE generates the third measurement signal according to the single beam in the third measurement configuration information.

The sixth receiving module 98 is configured to receive the third measurement signal reported by the UE and generated according to the third measurement configuration information sent by the fourth sending module 97.

According to the embodiment, the reference beam is determined, the single beam is configured for the UE, and the single beam is the determined reference beam, so that the UE may generate the third measurement signal according to the configured reference beam, and the accuracy of the measurement signal is improved.

Figure 9F:
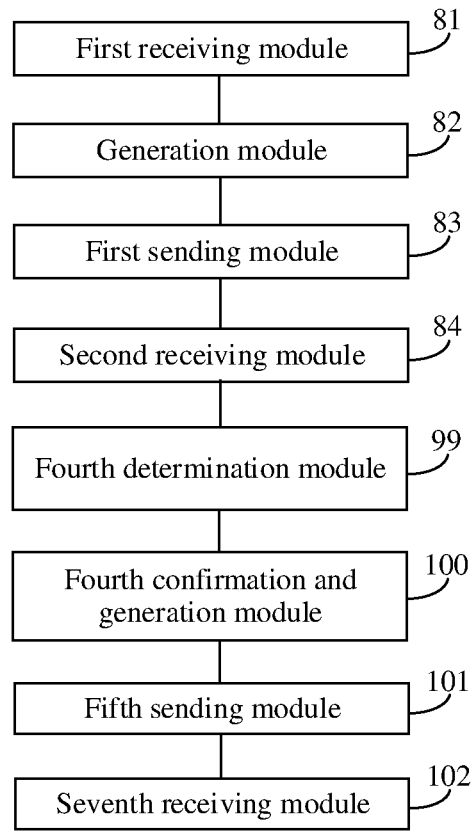
FIG. 9F is a block diagram of a device for receiving a measurement signal, according to an exemplary embodiment.

FIG. 9F is a block diagram of a device for receiving a measurement signal, according to an exemplary embodiment. Based on the embodiment illustrated in FIG. 8, the first measurement configuration information further includes the measurement resource corresponding to each beam, the measurement resource corresponding to each beam being the same, and the first measurement signals include the first measurement signals each of which corresponds to a respective beam. As illustrated in FIG. 9F, the device may further include a fourth determination module 99, a fourth confirmation and generation module 100, a fifth sending module 101 and a seventh receiving module 102.

The fourth determination module 99 is configured to, after the second receiving module 84 receives the first measurement signals reported by the UE, determine the reference beam according to the first measurement signals each of which corresponds to a respective beam.

The fourth confirmation and generation module 100 is configured to, if it is determined that a signal of a cell where the UE is located is less than the first preset threshold value and a signal of a neighboring cell is greater than the second preset threshold value, generate the third measurement configuration information, the third measurement configuration information including the single beam configured for the UE by the base station, the single beam being the reference beam determined by the fourth determination module 99 and the first preset threshold value being greater than the second preset threshold value.

The fifth sending module 101 is configured to send the third measurement configuration information generated by the fourth confirmation and generation module 100 to the UE such that the UE generates the third measurement signal according to the single beam in the third measurement configuration information.

The seventh receiving module 102 is configured to receive the third measurement signal reported by the UE and generated according to the third measurement configuration information sent by the fifth sending module 101.

According to the embodiment, the reference beam is determined, the single beam is configured for the UE, and the single beam is the determined reference beam, so that the UE may generate the third measurement signal according to the configured reference beam, and the accuracy of the measurement signal is improved.

Figure 10:
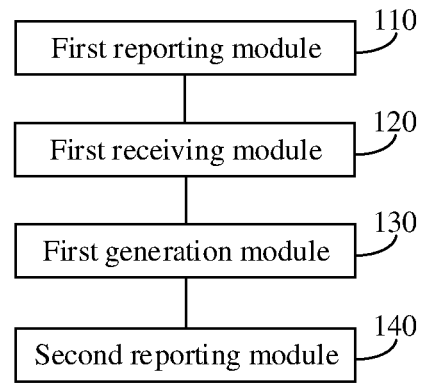
FIG. 10 is a block diagram of a device for reporting a measurement signal, according to an exemplary embodiment.

FIG. 10 is a block diagram of a device for reporting a measurement signal, according to an exemplary embodiment. As illustrated in FIG. 10, the device includes a first reporting module 110, a first receiving module 120, a first generation module 130 and a second reporting module 140.

The first reporting module 110 is configured to report multi-beam measurement capability information of UE to a base station.

The UE may report its own multi-beam measurement capability information to the base station.

The first receiving module 120 is configured to receive first measurement configuration information sent by the base station according to the multi-beam measurement capability information reported by the first reporting module 110, the first measurement configuration information including multiple beams configured for the UE by the base station;

The base station, after receiving the multi-beam measurement capability information reported by the UE, may generate the first measurement configuration information according to the multi-beam measurement capability information reported by the UE and send the first measurement configuration information to the UE.

In an embodiment, the multiple beams in the first measurement configuration information may be neighboring beams, and the first measurement configuration information may further include indication information for simultaneous measurement of the neighboring beams.

The first generation module 130 is configured to generate first measurement signals according to the multiple beams in the first measurement configuration information received by the first receiving module 120.

The UE may generate the first measurement signals according to the multiple beams in the first measurement configuration information to improve accuracy of the measurement signal. For example, corresponding measurement signals may be generated based on signal synchronization blocks of the multiple beams, and the measurement signals are smoothed to obtain first measurement signals.

In an embodiment, if the first measurement configuration information includes the indication information for simultaneous measurement of the neighboring beams and the multiple beams are neighboring beams, the UE may simultaneously generate the first measurement signals, each of which corresponds to a respective beam, according to the neighboring beams and the indication information.

The second reporting module 140 is configured to report the first measurement signals generated by the first generation module 130 to the base station.

The UE may report the first measurement signals to the base station.

According to the embodiment, the multi-beam measurement capability information of the UE is reported to the base station to enable the base station to send the first measurement configuration information to the UE according to the multi-beam measurement capability information reported by the UE, and the UE, after receiving the first measurement configuration information, may generate the first measurement signals according to the multiple beams in the first measurement configuration information and reports the first measurement signals to the base station, so that the accuracy of the measurement signal of the UE in the multi-beam coverage scenario is improved.

Figure 11A:
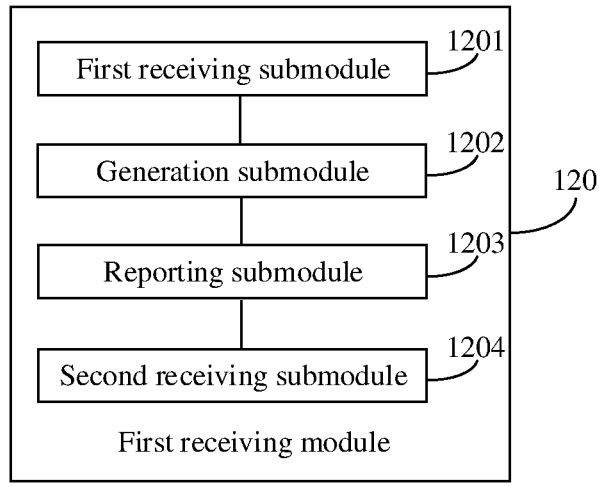
FIG. 11A is a block diagram of a device for reporting a measurement signal, according to an exemplary embodiment.

FIG. 11A is a block diagram of a device for reporting a measurement signal, according to an exemplary embodiment. As illustrated in FIG. 11A, based on the embodiment illustrated in FIG. 10, the first receiving module 120 may include a first receiving submodule 1201, a generation submodule 1202, a reporting submodule 1203 and a second receiving submodule 1204.

The first receiving submodule 1201 is configured to receive second measurement configuration information sent by the base station according to the multi-beam measurement capability information, the second measurement configuration information including a single beam configured for the UE by the base station.

In the embodiment, since the UE has a multi-beam measurement capability, the base station may configure the single beam for the UE at first.

The generation submodule 1202 is configured to generate a second measurement signal according to the single beam in the second measurement configuration information received by the first receiving submodule 1201.

The UE, after receiving the configured single beam, may generate the second measurement signal according to the single beam.

The reporting submodule 1203 is configured to report the second measurement signal generated by the generation submodule 1202 to the base station.

The UE may report the second measurement signal to the base station.

The second receiving submodule 1204 is configured to receive the first measurement configuration information sent by the base station according to the second measurement signal reported by the reporting submodule 1203.

If the second measurement signal received by the base station is inconsistent with an estimated second measurement signal, beams may be reconfigured for the UE, for example, the first measurement configuration information including the multiple beams may be sent to the UE.

According to the embodiment, the second measurement signal is generated according to the single beam in the second measurement configuration information sent by the base station and the first measurement configuration information sent by the base station according to the second measurement signal is received, to implement configuration of the multiple beams instead of the single beam under the condition that the second measurement signal generated based on the single beam is not so accurate to enable the UE to generate the first measurement signals based on the multiple beams, so that improvement in the accuracy of the measurement signal is improved.

Figure 11B:
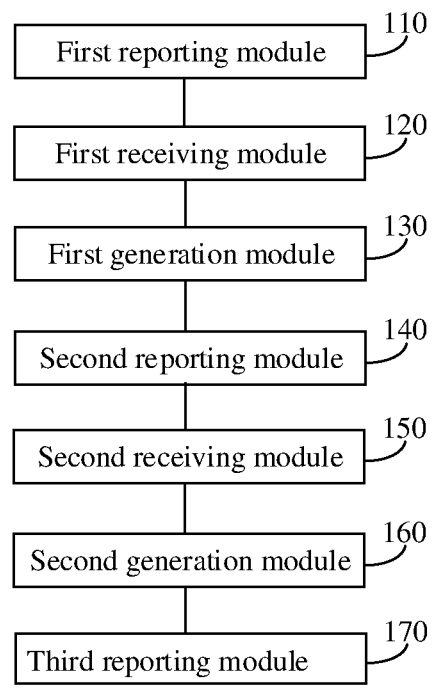
FIG. 11B is a block diagram of a device for reporting a measurement signal, according to an exemplary embodiment.

FIG. 11B is a block diagram of a device for reporting a measurement signal, according to an exemplary embodiment. As illustrated in FIG. 11B, based on the embodiment illustrated in FIG. 10, the device may further include a second receiving module 150, a second generation module 160 and a third reporting module 170.

The second receiving module 150 is configured to receive third measurement configuration information sent by the base station, the third measurement configuration information including the single beam configured for the UE by the base station.

The UE may receive the third measurement configuration information sent by the base station, the third measurement configuration information may include the single beam configured for the UE by the base station, and the single beam may be a beam with relatively measurement signal quality in the multiple beams corresponding to the UE.

The second generation module 160 is configured to generate a third measurement signal according to the single beam in the third measurement configuration information received by the second receiving module 150.

The UE may generate the third measurement signal according to the single beam in the third measurement configuration information.

The third reporting module 170 is configured to report the third measurement signal generated by the second generation module 160 to the base station.

The UE may report the third measurement signal to the base station.

According to the embodiment, the third measurement configuration information sent by the base station is received, the third measurement signal is generated according to the single beam in the third measurement configuration information, and the third measurement signal is reported to the base station, so that the accuracy of the measurement signal is ensured.

Figure 12:
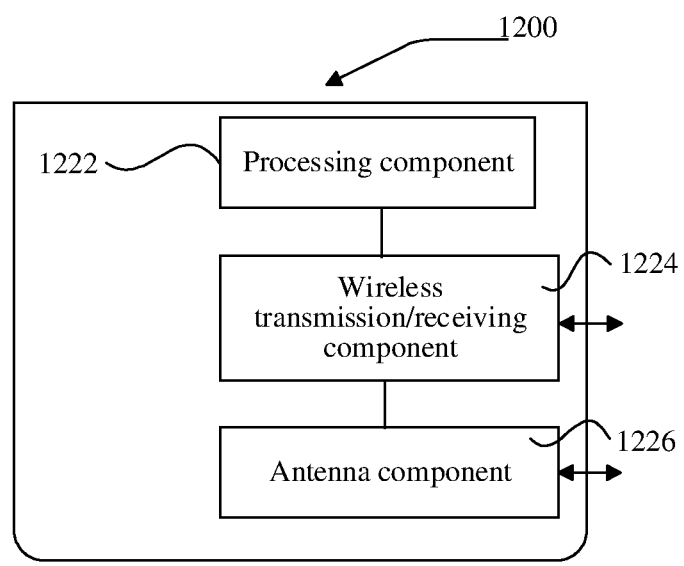
FIG. 12 is a block diagram of a device for receiving a measurement signal, according to an exemplary embodiment.

FIG. 12 is a block diagram of a device 1200 for receiving a measurement signal, according to an exemplary embodiment. The device 1200 may be provided as a base station. Referring to FIG. 12, the device 1200 includes a processing component 1222, a wireless transmission/receiving component 1224, an antenna component 1226 and a wireless interface-specific signal processing part, and the processing component 1222 may further include one or more processors.

In exemplary embodiments, the processing component 1222 may be configured to perform the methods described above. For example, the processing component 1222 is configured to: receive multi-beam measurement capability information reported by UE; generate first measurement configuration information for the UE according to the multi-beam measurement capability information, the first measurement configuration information including multiple beams configured for the UE by the base station; send the first measurement configuration information to the UE such that the UE generates first measurement signals according to the multiple beams in the first measurement configuration information; and receive the first measurement signals reported by the UE.

Figure 13:
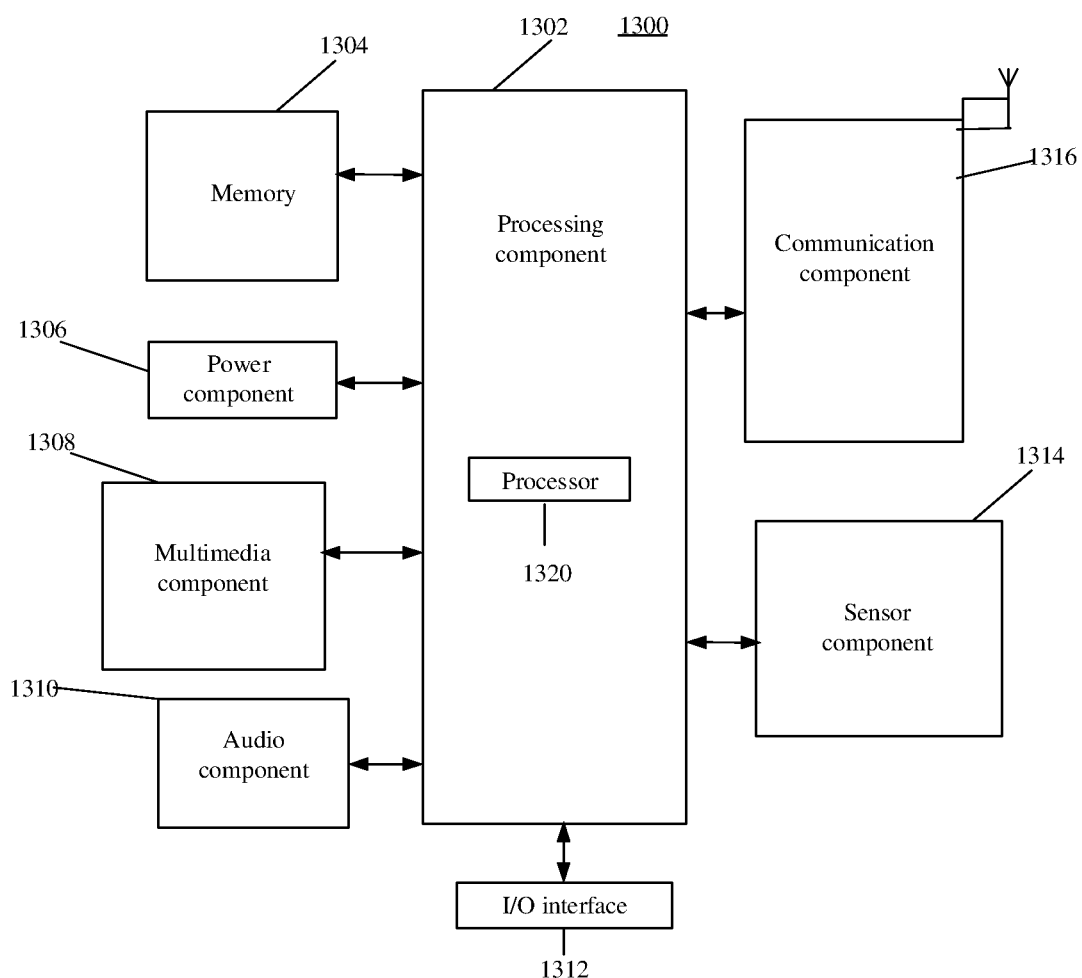
FIG. 13 is a block diagram of a device for reporting a measurement signal, according to an exemplary embodiment.

FIG. 13 is a block diagram of a device 1300 for reporting a measurement signal, according to an exemplary embodiment. For example, the device 1300 may be UE such as a mobile phone, a computer, a digital broadcast terminal, a messaging device, a gaming console, a tablet, a medical device, exercise equipment and a personal digital assistant.

Referring to FIG. 13, the device 1300 may include one or more of the following components: a processing component 1302, a memory 1304, a power component 1306, a multimedia component 1308, an audio component 1310, an Input/Output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate interaction between the processing component 1302 and the other components. For instance, the processing component 1302 may include a multimedia module to facilitate interaction between the multimedia component 1308 and the processing component 1302.

The memory 1304 is configured to store various types of data to support the operation of the device 1300. Examples of such data include instructions for any application programs or methods operated on the device 1300, contact data, phonebook data, messages, pictures, video, etc. The memory 1304 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1306 provides power for various components of the device 1300. The power component 1306 may include a power management system, one or more power supplies, and other components associated with generation, management and distribution of power for the device 1300.

The multimedia component 1308 includes a screen providing an output interface between the device 1300 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1308 includes a front camera and/or a rear camera. The front camera and/or the rear camera may receive external multimedia data when the device 1300 is in an operation mode, such as a photographing mode or a video mode. Each of the front camera and the rear camera may be a fixed optical lens system or have focusing and optical zooming capabilities.

The audio component 1310 is configured to output and/or input an audio signal. For example, the audio component 1310 includes a Microphone (MIC), and the MIC is configured to receive an external audio signal when the device 1300 is in the operation mode, such as a call mode, a recording mode and a voice recognition mode. The received audio signal may further be stored in the memory 1304 or sent through the communication component 1316. In some embodiments, the audio component 1310 further includes a speaker configured to output the audio signal.

The I/O interface 1312 provides an interface between the processing component 1302 and a peripheral interface module, and the peripheral interface module may be a keyboard, a click wheel, a button and the like. The button may include, but not limited to: a home button, a volume button, a starting button and a locking button.

The sensor component 1314 includes one or more sensors configured to provide status assessment in various aspects for the device 1300. For instance, the sensor component 1314 may detect an on/off status of the device 1300 and relative positioning of components, such as a display and small keyboard of the device 1300, and the sensor component 1314 may further detect a change in a position of the device 1300 or a component of the device 1300, presence or absence of contact between the user and the device 1300, orientation or acceleration/deceleration of the device 1300 and a change in temperature of the device 1300. The sensor component 1314 may include a proximity sensor configured to detect presence of an object nearby without any physical contact. The sensor component 1314 may also include a light sensor, such as a Complementary Metal Oxide Semiconductor (CMOS) or Charge Coupled Device (CCD) image sensor, configured for use in an imaging application. In some embodiments, the sensor component 1314 may also include an acceleration sensor, a gyroscope sensor, a magnetic sensor, a pressure sensor or a temperature sensor.

The communication component 1316 is configured to facilitate wired or wireless communication between the device 1300 and other equipment. The device 1300 may access a communication-standard-based wireless network, such as a Wireless Fidelity (WiFi) network, a 4th-Generation (4G) or 5th-Generation (5G) network or a combination thereof. In an exemplary embodiment, the communication component 1316 receives a broadcast signal or broadcast associated information from an external broadcast management system through a broadcast channel In an exemplary embodiment, the communication component 1316 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 1300 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1304 including an instruction, and the instruction may be executed by the processor 1320 of the device 1300 to implement the above described methods. For example, the non-transitory computer-readable storage medium may be a ROM, a Random Access Memory (RAM), a Compact Disc Read-Only Memory (CD-ROM), a magnetic tape, a floppy disc, optical data storage equipment and the like.

The device embodiments substantially correspond to the method embodiments, and thus related parts refer to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the embodiments. Those of ordinary skill in the art may understand and implement without creative work.

It is to be noted that relational terms "first", "second" and the like in the present disclosure are adopted only to distinguish one entity or operation from another entity or operation and not always to require or imply existence of any such practical relationship or sequence between the entities or operations. Terms "include" and "have" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an" does not exclude existence of another element that is the same in a process, method, object or device including the element.

It will be appreciated that the embodiments of the present disclosure are not limited to the exact construction that has been described above and illustrated in the accompanying drawings, and that various modifications and changes can be made without departing from the scope thereof. It is intended that the scope of the embodiments of the present disclosure only be limited by the appended claims.

What is claimed is:

1. A method for receiving a measurement signal, comprising:
  receiving multi-beam measurement capability information reported by user equipment (UE), the multi-beam measurement capability information being configured to indicate that the UE has capability of performing measurement based on multiple beams;
  generating first configuration information for measurement to be performed by the UE according to the multi-beam measurement capability information, the first configuration information comprising multiple beams configured for the UE by a base station;
  sending the first configuration information to the UE such that the UE generates first measurement signals according to the multiple beams in the first configuration information; and
  receiving the first measurement signals reported by the UE;
  wherein the generating the first configuration information comprises:
    generating second configuration information for measurement to be performed by the UE according to the multi-beam measurement capability information, the second configuration information comprising a single beam configured for the UE by the base station;
    sending the second configuration information to the UE such that the UE generates a second measurement signal according to the single beam in the second configuration information;
    receiving the second measurement signal reported by the UE; and
    if the received second measurement signal is inconsistent with an estimated second measurement signal, generating the first configuration information for the UE, the first configuration information comprising the multiple beams configured for the UE by the base station.

2. The method of claim 1, wherein the multiple beams comprise a primary beam and at least one secondary beam, the first configuration information further comprises a measurement resource corresponding to the primary beam and measurement resources corresponding to the at least one secondary beam respectively, the measurement resource corresponding to the primary beam being greater than the measurement resource corresponding to each secondary beam, the first measurement signals corresponding to the multiple beams, respectively, and
  after receiving the first measurement signals reported by the UE, the method further comprises:
  if it is determined, according to the first measurement signals corresponding to the multiple beams, respectively, that the UE is at a geometric center of the multiple beams, updating the measurement resource corresponding to each of the multiple beams to make the measurement resource corresponding to the primary beam equal to the measurement resource corresponding to each secondary beam; and
receiving the first measurement signals corresponding to the multiple beams and reported by the UE according to the updated measurement resources.

3. The method of claim 2, before updating the measurement resource corresponding to each of the multiple beams, further comprising:
determining a reference beam according to the first measurement signals;
if it is determined that a signal of a cell where the UE is located is greater than a first preset threshold value and a signal of a neighboring cell is less than a second preset threshold value, generating third configuration information for measurement to be performed by the UE, the third configuration information comprising a single beam configured for the UE by the base station, the single beam being the reference beam and the first preset threshold value being greater than the second preset threshold value;
sending the third configuration information the UE such that the UE generates a third measurement signal according to the single beam in the third configuration information; and
receiving the third measurement signal reported by the UE.

4. The method of claim 2, before updating the measurement resource corresponding to each of the multiple beams, further comprising:
determining a reference beam according to the first measurement signals;
if it is determined that a signal of a cell where the UE is located is less than a first preset threshold value and a signal of a neighboring cell is greater than a second preset threshold value, generating third configuration information for measurement to be performed by the UE, the third configuration information comprising a single beam configured for the UE by the base station, the single beam being the reference beam and the first preset threshold value being greater than the second preset threshold value;
sending the third configuration information to the UE such that the UE generates the third measurement signal according to the single beam in the third configuration information; and
receiving the third measurement signal reported by the UE.

5. The method of claim 1, wherein the first configuration information further comprises a same measurement resource corresponding to each of the multiple beams, the first measurement signals correspond to the multiple beams, respectively, and after receiving the first measurement signals reported by the UE, the method further comprises:
determining a reference beam according to the first measurement signals;
if it is determined that a signal of a cell where the UE is located is greater than a first preset threshold value and a signal of a neighboring cell is less than a second preset threshold value, generating third configuration information for measurement to be performed by the UE, the third configuration information comprising a single beam configured for the UE by the base station, the single beam being the reference beam and the first preset threshold value being greater than the second preset threshold value;
sending the third configuration information to the UE such that the UE generates a third measurement signal according to the single beam in the third configuration information; and
receiving the third measurement signal reported by the UE.

6. The method of claim 1, wherein the first configuration information further comprises a same measurement resource corresponding to each of the multiple beams, the first measurement signals correspond to the multiple beams, respectively, and after receiving the first measurement signals reported by the UE, the method further comprises:
determining a reference beam according to the first measurement signals;
if it is determined that a signal of a cell where the UE is located is less than the first preset threshold value and a signal of a neighboring cell is greater than the second preset threshold value, generating third configuration information for measurement to be performed by the UE, the third configuration information comprising a single beam configured for the UE by the base station, the single beam being the reference beam and the first preset threshold value being greater than the second preset threshold value;
sending the third configuration information to the UE such that the UE generates a third measurement signal according to the single beam in the third configuration information; and
receiving the third measurement signal reported by the UE.

7. The method of claim 1, wherein the multiple beams in the first configuration information comprise neighboring beams, the first configuration information further comprises indication information for simultaneous measurement of the neighboring beams, and the first configuration information is configured for the UE to simultaneously generate the first measurement signals corresponding to the multiple beams respectively, according to the neighboring beams and the indication information.

8. A method for reporting a measurement signal, comprising:
reporting multi-beam measurement capability information of user equipment (UE) to a base station, the multi-beam measurement capability information being configured to indicate that the UE has capability of performing measurement based on multiple beams;
receiving first configuration information sent by the base station according to the multi-beam measurement capability information, the first configuration information comprising multiple beams configured by the base station for the UE to perform measurement;
generating first measurement signals according to the multiple beams in the first configuration information; and
reporting the first measurement signals to the base station;
wherein the receiving the first configuration information comprises:
receiving second configuration information sent by the base station according to the multi-beam measurement capability information, the second configuration information comprising a single beam configured by the base station for the UE to perform measurement;
generating a second measurement signal according to the single beam in the second configuration information;

reporting the second measurement signal to the base station; and receiving the first configuration information sent by the base station according to the second measurement signal.

9. The method of claim 8, further comprising:
receiving third configuration information sent by the base station, the third configuration information comprising a single beam configured by the base station for the UE to perform measurement;
generating a third measurement signal according to the single beam in the third configuration information; and
reporting the third measurement signal to the base station.

10. The method of claim 8, wherein the multiple beams in the first configuration information comprise neighboring beams, the first configuration information further comprises indication information for simultaneous measurement of the neighboring beams, and generating the first measurement signals according to the multiple beams in the first configuration information comprises:
simultaneously generating the first measurement signals corresponding to the multiple beams, respectively, according to the neighboring beams and the indication information.

11. A base station, comprising:
a processor; and
a memory configured to store instructions executable by the processor,
wherein the processor is configured to:
receive multi-beam measurement capability information reported by user equipment (UE), the multi-beam measurement capability information being configured to indicate that the UE has capability of performing measurement based on multiple beams;
generate first configuration information for measurement to be performed by the UE according to the multi-beam measurement capability information, the first configuration information comprising multiple beams configured for the UE by the base station;
send the first configuration information to the UE such that the UE generates first measurement signals according to the multiple beams in the first configuration information; and
receive the first measurement signals reported by the UE;
wherein in generating the first configuration information, the processor is further configured to:
generate second configuration information for measurement to be performed by the UE according to the multi-beam measurement capability information, the second configuration information comprising a single beam configured for the UE by the base station;
send the second configuration information to the UE such that the UE generates a second measurement signal according to the single beam in the second configuration information;
receive the second measurement signal reported by the UE; and
if the received second measurement signal is inconsistent with an estimated second measurement signal, generate the first configuration information for the UE, the first configuration information comprising the multiple beams configured for the UE by the base station.

12. The base station of claim 11, wherein the multiple beams comprise a primary beam and at least one secondary beam, the first configuration information further comprises a measurement resource corresponding to the primary beam and measurement resources corresponding to the at least one secondary beam respectively, the measurement resource corresponding to the primary beam being greater than the measurement resource corresponding to each secondary beam, the first measurement signals corresponding to the multiple beams, respectively, and
the processor is further configured to:
if it is determined, according to the first measurement signals corresponding to the multiple beams, respectively, that the UE is at a geometric center of the multiple beams, update the measurement resource corresponding to each of the multiple beams to make the measurement resource corresponding to the primary beam equal to the measurement resource corresponding to each secondary beam; and
receive the first measurement signals corresponding to the multiple beams and reported by the UE according to the updated measurement resources.

13. The base station of claim 12, wherein the processor is further configured to:
before updating the measurement resource corresponding to each of the multiple beams, determine a reference beam according to the first measurement signals;
if it is determined that a signal of a cell where the UE is located is greater than a first preset threshold value and a signal of a neighboring cell is less than a second preset threshold value, generate third configuration information for measurement to be performed by the UE, the third configuration information comprising a single beam configured for the UE by the base station, the single beam being the reference beam and the first preset threshold value being greater than the second preset threshold value;
send the third configuration information to the UE such that the UE generates a third measurement signal according to the single beam in the third configuration information; and
receive the third measurement signal reported by the UE.

14. The base station of claim 12, wherein the processor is further configured to:
before updating the measurement resource corresponding to each of the multiple beams, determine a reference beam according to the first measurement signals;
if it is determined that a signal of a cell where the UE is located is less than a first preset threshold value and a signal of a neighboring cell is greater than a second preset threshold value, generate third configuration information for measurement to be performed by the UE, the third configuration information comprising a single beam configured for the UE by the base station, the single beam being the reference beam and the first preset threshold value being greater than the second preset threshold value;
send the third configuration information to the UE such that the UE generates a third measurement signal according to the single beam in the third configuration information; and
receive the third measurement signal reported by the UE.

15. The base station of claim 11, wherein the first configuration information further comprises a same measurement resource corresponding to each of the multiple beams, the first measurement signals correspond to the multiple beams, respectively, and
the processor is further configured to:
determine a reference beam according to the first measurement signals;

if it is determined that a signal of a cell where the UE is located is greater than a first preset threshold value and a signal of a neighboring cell is less than a second preset threshold value, generate third configuration information for measurement to be performed by the UE, the third configuration information comprising a single beam configured for the UE by the base station, the single beam being the reference beam and the first preset threshold value being greater than the second preset threshold value;

send the third configuration information the UE such that the UE generates a third measurement signal according to the single beam in the third configuration information; and receive the third measurement signal reported by the UE.

16. The base station of claim 11, wherein the first configuration information further comprises a same measurement resource corresponding to each of the multiple beams, the first measurement signals correspond to the multiple beams, respectively, and the processor is further configured to:

determine a reference beam according to the first measurement signals;

if it is determined that a signal of a cell where the UE is located is less than a first preset threshold value and a signal of a neighboring cell is greater than a second preset threshold value, generate third configuration information for measurement to be performed by the UE, the third configuration information comprising a single beam configured for the UE by the base station, the single beam being the reference beam and the first preset threshold value being greater than the second preset threshold value;

send the third configuration information to the UE such that the UE generates a third measurement signal according to the single beam in the third configuration information; and receive the third measurement signal reported by the UE.

17. The base station of claim 11, wherein the multiple beams in the first configuration information comprise neighboring beams, the first configuration information further comprises indication information for simultaneous measurement of the neighboring beams, and the first configuration information is configured for the UE to simultaneously generate the first measurement signals corresponding to the multiple beams respectively, according to the neighboring beams and the indication information.

18. User equipment (UE), comprising:
a processor; and a memory configured to store instructions executable by the processor, wherein the processor is configured to:

report multi-beam measurement capability information of the UE to a base station, the multi-beam measurement capability information being configured to indicate that the UE has capability of performing measurement based on multiple beams;

receive first configuration information sent by the base station according to the multi-beam measurement capability information, the first configuration information comprising multiple beams configured by the base station for the UE to perform measurement;

generate first measurement signals according to the multiple beams in the first configuration information; and report the first measurement signals to the base station;

wherein in receiving the first configuration information, the processor is further configured to:

receive second configuration information sent by the base station according to the multi-beam measurement capability information, the second configuration information comprising a single beam configured for the UE by the base station;

generate a second measurement signal according to the single beam in the second configuration information;

report the second measurement signal to the base station; and receive the first configuration information sent by the base station according to the second measurement signal.

19. The UE of claim 18, wherein the processor is further configured to:

receive third configuration information sent by the base station, the third configuration information comprising a single beam configured by the base station for the UE to perform measurement;

generate a third measurement signal according to the single beam in the third configuration information; and report the third measurement signal to the base station.

20. The UE of claim 18, wherein the multiple beams in the first configuration information comprise neighboring beams, the first configuration information further comprises indication information for simultaneous measurement of the neighboring beams, and wherein the processor is configured to:

simultaneously generate the first measurement signals corresponding to the multiple beams, respectively, according to the neighboring beams and the indication information.

* * * * *